(12) United States Patent
Shiokawa et al.

(10) Patent No.: US 11,285,654 B2
(45) Date of Patent: Mar. 29, 2022

(54) LIQUID BLOW MOLDING DEVICE

(71) Applicant: YOSHINO KOGYOSHO CO., LTD., Tokyo (JP)

(72) Inventors: Mitsuru Shiokawa, Tokyo (JP); Hideaki Hoshino, Tokyo (JP); Yuichi Okuyama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 16/965,241

(22) PCT Filed: Nov. 13, 2018

(86) PCT No.: PCT/JP2018/042025
§ 371 (c)(1),
(2) Date: Jul. 27, 2020

(87) PCT Pub. No.: WO2019/150701
PCT Pub. Date: Aug. 8, 2019

(65) Prior Publication Data
US 2021/0060845 A1 Mar. 4, 2021

(30) Foreign Application Priority Data
Jan. 31, 2018 (JP) .............................. JP2018-015850

(51) Int. Cl.
*B29C 49/46* (2006.01)
*B29C 49/58* (2006.01)
*B29C 49/12* (2006.01)

(52) U.S. Cl.
CPC .............. *B29C 49/12* (2013.01); *B29C 49/46* (2013.01)

(58) Field of Classification Search
CPC .............. B29C 49/46; B29C 2049/465; B29C 2049/4655; B29C 2049/4664; B29C 2049/5803; B29C 2049/5893
See application file for complete search history.

(56) References Cited

U.S. PATENT DOCUMENTS

| 10,703,038 B2 * | 7/2020 | Morikami ............... B29C 49/12 |
| 2014/0356475 A1 | 12/2014 | Sato et al. |

(Continued)

FOREIGN PATENT DOCUMENTS

| JP | H09-118314 A | 5/1997 |
| JP | 2017-196872 A | 11/2017 |

(Continued)

OTHER PUBLICATIONS

Jan. 8, 2019 International Search Report issued in International Patent Application No. PCT/JP2018/042025.

(Continued)

*Primary Examiner* — Robert B Davis
(74) *Attorney, Agent, or Firm* — Oliff PLC

(57) ABSTRACT

A liquid blow molding device includes: a supply block including a supply path; a blow nozzle detachably attached to the supply block; a pressurized liquid supply unit configured to supply the pressurized liquid to the blow nozzle; an annular-shaped sealing surface that is provided in a portion of the supply block that is located between an inner circumferential surface defining the supply path and the outlet and that surrounds an entire circumference of the outlet; and a sealing body that is disposed inside the supply path and that is displaceable between a closing position, in which the sealing body abuts against the sealing surface to close the outlet, and an opening position, in which the sealing body is spaced from the sealing surface to open the outlet.

5 Claims, 6 Drawing Sheets

(56) References Cited

U.S. PATENT DOCUMENTS

| | | |
|---|---|---|
| 2016/0200029 A1 | 7/2016 | Shiokawa et al. |
| 2016/0243748 A1 | 8/2016 | Tabata et al. |
| 2017/0190095 A1* | 7/2017 | Beuerle .................. B29C 49/46 |
| 2020/0189170 A1* | 6/2020 | Toyoda .................. B29C 49/12 |

FOREIGN PATENT DOCUMENTS

| | | |
|---|---|---|
| JP | 2018-001575 A | 1/2018 |
| WO | 2018/003256 A1 | 1/2018 |

OTHER PUBLICATIONS

Aug. 4, 2020 International Preliminary Report on Patentability issued in International Patent Application No. PCT/JP2018/042025.
Jul. 27, 2021 Office Action issued in Japanese Patent Application No. 2018-015850.
Aug. 3, 2021 Office Action issued in Chinese Patent Application No. 201880088034.7.
Sep. 14, 2021 Extended European Search Report issued in European Patent Application No. 18903141.2.

* cited by examiner

LIQUID BLOW MOLDING DEVICE

TECHNICAL FIELD

This disclosure relates to a liquid blow molding device that blow molds a synthetic resin-made preform into a container having a predetermined shape, by supplying a pressurized liquid into the preform.

BACKGROUND

Synthetic resin-made containers, typical examples of which include a polypropylene (PP) bottle and a polyethylene terephthalate (PET) bottle, have been used to contain, as content liquids, a variety of liquids, as exemplified by a beverage, a cosmetic product, a pharmaceutical product, a detergent, and a toiletry such as shampoo. Such a container is typically manufactured by blow molding a preform which has been formed, for example, in a closed-bottom tubular shape using a thermoplastic synthetic resin material as described above.

A liquid blow molding device for molding the preform into the container is also known. Such a blow molding device may use a pressurized liquid, instead of pressurized air, as a pressurizing medium to be supplied into the preform.

Patent Literature 1, for example, describes a liquid blow molding device including: a supply block including a supply path for the liquid; a blow nozzle attached to the supply block in a manner such that blow nozzle communicates with the supply path; a pressurized liquid supply unit connected to the supply path; and a sealing body that is disposed inside the supply path and that is displaceable between a closing position and an opening position. In the closing position, the sealing body abuts against a sealing surface formed on an upper surface of the blow nozzle to close the blow nozzle, while, in the opening position, the sealing body is spaced from the sealing surface to open the blow nozzle. The synthetic resin-made preform is heated in advance to a temperature at which stretchability may be achieved and placed in a mold used for blow molding, and the blow nozzle is engaged to a mouth of the heated preform, and then, the sealing body is displaced to the opening position. In this state, the pressurized liquid supply unit is activated to supply the pressurized liquid into the preform through the supply path and the blow nozzle. In this way, the described liquid blow molding device molds the preform into the container having a predetermined shape conforming to a cavity of the mold. By using, as the liquid to be supplied into the preform, the content liquid, such as a beverage, that is to be contained in the container as a final product, the above liquid blow molding device molds the container concurrently with filling the content liquid to the container, thereby facilitating the molding of the liquid container containing the content liquid. The above liquid blow molding device therefore omits the step of filling the content liquid to the molded container and simplifies the production process and the configuration of production line (or the device).

CITATION LIST

Patent Literature

PTL 1: JP2017-196872 A

SUMMARY

Technical Problem

In the above liquid blow molding device, the blow nozzle is typically attached to the supply block in a detachable manner, so that any of various types of the blow nozzle adapted to molding of various types of the container with different mouth shapes or different outer diameters may be attached to the supply block. This typical configuration allows, in the event of failure of the blow nozzle, the blow nozzle to be detached from the supply block for inspection or the like. After the blow nozzle is detached from the supply block, a discharge hose may also be attached instead of the blow nozzle. This facilitates, when, for example, an inside of a flow path is cleaned, a liquid discharge operation from the flow path.

However, since the sealing body in the conventional liquid blow molding device is configured to close the blow nozzle by abutting against the sealing surface formed on the blow nozzle, there has been the following issue. That is, when the blow nozzle is detached from the supply block for the purpose of exchange and inspection of the blow nozzle, or replacement of the blow nozzle with the discharge hose, the supply path remains open to the outside without being closed by the sealing body, and the liquid inside the supply path starts to leak to the outside.

One possible solution to address the above issue is to remove the liquid in advance from a flow path between the pressurized liquid supply unit and the blow nozzle before detaching the blow nozzle from the supply block. Yet, this solution will result in the needs to supply the liquid again to the flow path between the pressurized liquid supply unit and the blow nozzle and to conduct an operation of bleeding air out of the flow path after the blow nozzle is attached to the supply block, thus entailing a complicated operation.

It would thus be helpful to provide a liquid blow molding device in which the blow nozzle is detachable without letting the liquid leak from the supply path.

Solution to Problem

An aspect of the present disclosure resides in a liquid blow molding device that blow molds a synthetic resin-made preform into a container having a predetermined shape, by supplying a pressurized liquid into the preform. The liquid blow molding device includes: a supply block including a supply path for the liquid; a blow nozzle that is detachably attached to the supply block in a manner such that the blow nozzle communicates with an outlet of the supply path and that is configured to engage to a mouth of the preform; a pressurized liquid supply unit that is connected to the supply path and that is configured to supply the pressurized liquid to the blow nozzle via the supply path; an annular-shaped sealing surface that is provided in a portion of the supply block that is located between an inner circumferential surface defining the supply path and the outlet and that surrounds an entire circumference of the outlet; and a sealing body that is disposed inside the supply path and that is displaceable between a closing position and an opening position, wherein, in the closing position, the sealing body abuts against the sealing surface to close the outlet, and in the opening position, the sealing body is spaced from the sealing surface to open the outlet.

In a preferred embodiment of the present liquid blow molding device configured as above, the sealing surface has a tapered shape gradually decreasing in diameter in a direction from the inner circumferential surface toward the outlet.

In another preferred embodiment of the present liquid blow molding device configured as above, the blow nozzle is provided with a sub-sealing surface situated flush with and adjacent to the sealing surface, and a sub-sealing body is detachably attached to the sealing body, the sub-sealing body being configured to abut against the sub-sealing surface when the sealing body is in the closing position.

In yet another preferred embodiment of the present liquid blow molding device configured as above, the sub-sealing body includes a protrusion configured to be disposed inside the blow nozzle when the sealing body is in the closing position.

In yet another preferred embodiment of the present liquid blow molding device configured as above, the supply block includes: a block body including i) a supply path formation hole having a uniform inner diameter and being open at one end of the block body, ii) the outlet having an inner diameter smaller than the inner diameter of the supply path formation hole and being open at another end of the block body, and iii) the sealing surface provided between an inner circumferential surface of the supply path formation hole and the outlet and formed integrally and contiguous with the inner circumferential surface of the supply path formation hole;
- a block lid that is inserted to the supply path formation hole at the one end of the block body to close one end of the supply path formation hole and that, together with the block body, defines the supply path inside the block body; and
- a supply port that is provided in the block body, that communicates with the supply path, and that is open to a side surface of the block body to be connected to the pressurized liquid supply unit.

In yet another preferred embodiment of the present liquid blow molding device configured as above, the liquid blow molding device further includes a stretching rod that is configured to stretch the preform in an axial direction and that is provided to extend through an axial center of the sealing body in an advanceable and retractable manner.

Advantageous Effect

The present disclosure provides a liquid blow molding device in which the blow nozzle is detachable without letting the liquid leak from the supply path.

BRIEF DESCRIPTION OF THE DRAWINGS

In the accompanying drawings.

DETAILED DESCRIPTION

With reference to the drawings, the present disclosure is described in more details by illustration below.

Figure 1:
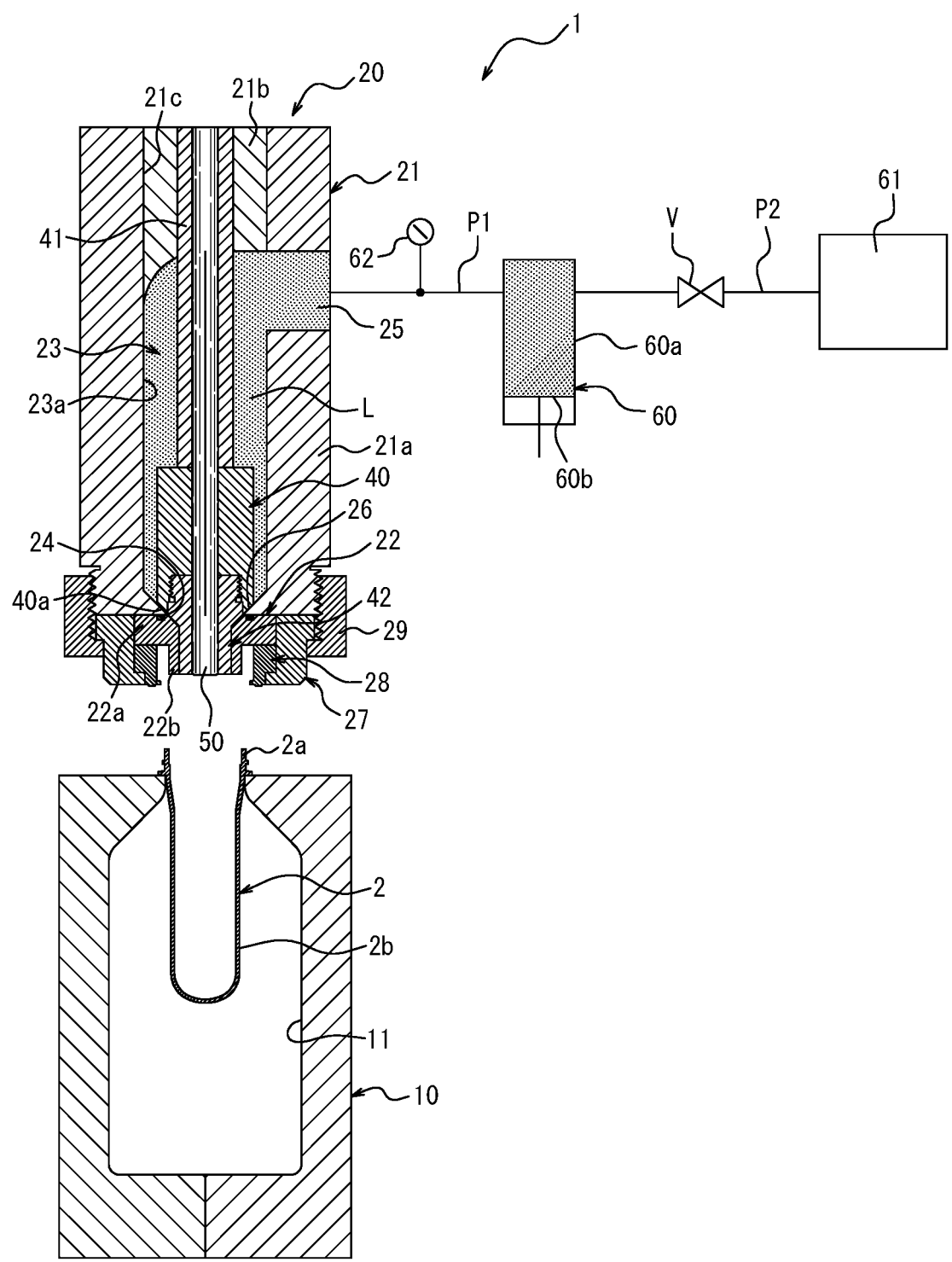
FIG. 1 illustrates a liquid blow molding device according to an embodiment of the present disclosure.

FIG. 1 illustrates a liquid blow molding device 1 according to an embodiment of the present disclosure. The liquid blow molding device 1 blow molds a synthetic resin-made preform 2 into a container having a predetermined shape, by supplying a pressurized liquid L to the preform 2.

The liquid L, which is supplied to the preform 2 as a pressurizing medium used in the blow molding, may be any of a variety of liquids, as exemplified by a beverage, a cosmetic product, a pharmaceutical product, a detergent, and a toiletry such as shampoo. The use of the liquid L as described above, that is, the use of a content liquid that is to be contained in the blow molded container as the liquid L, allows molding of the container to occur concurrently with filling of the content liquid to the container. This facilitates the molding of the liquid container containing the content liquid.

The preform 2 herein has been, for example, formed by injection molding a thermoplastic synthetic resin material, such as polypropylene (PP) and polyethylene terephthalate (PET), into a shape having a cylindrical-shaped mouth 2a, which serves as an opening end, and a closed-bottom cylindrical-shaped trunk 2b, which is contiguous with the mouth 2a. Although not illustrated in details, the mouth 2a is provided, on an outer circumferential surface thereof, with an engagement protrusion which allows a closing cap (which is not illustrated) to be attached to the mouth 2a of the molded container by plugging (i.e., undercut engagement). Additionally, instead of the engagement protrusion, a male screw may also be provided on the outer circumferential surface of the mouth 2a, and the closing cap may be attached to the mouth 2a by screw connection.

The preform 2 is not limited to the aforementioned example and may employ various shapes and materials. Possible examples of the preform 2 may include the one with a laminated structure in which a plurality of layers are integrally laminated or with a dual structure including an outer preform formed by injection molding and an inner preform formed separately from the outer preform by injection molding and assembled into the outer preform.

The liquid blow molding device 1 may include a mold 10, which is used for blow molding. The mold 10 has a cavity 11, which has a shape corresponding to a final shape, such as a bottle shape, of the container. The cavity 11 is open upward at an upper surface of the mold 10. The preform 2 is placed in the mold 10, with the trunk 2b being placed inside the cavity 11 of the mold 10 and with the mouth 2a protruding upward from the mold 10. The mold 10 may be opened into left and right mold halves, and, by opening the mold 10 into left and right mold halves after molding the preform 2 into the container, the container is removed from the mold 10.

The liquid blow molding device 1 includes a nozzle unit 20. The nozzle unit 20 is disposed above the mold 10 and is configured to be driven by a driving unit (which is not illustrated) to be displaced in an up-and-down direction, that is, to approach to and separate from the mold 10.

The nozzle unit 20 includes a supply block 21 and a blow nozzle 22.

The supply block 21 includes, inside thereof, a supply path 23, which extends in the up-and-down direction. The supply path 23 refers to a flow path used to supply the liquid L to the blow nozzle 22. The supply path 23 is formed with a circular section whose inner diameter is uniform in a lengthwise (i.e., up-and-down) direction. The supply path 23 communicates with an inner passage of the blow nozzle 22 at an outlet 24, which is provided at a lower end of the supply path 23.

In more details, the supply block 21 includes a block body 21a and a block lid 21b.

The block body 21a is formed by a steel material and has a supply path formation hole 21c, which has a circular section whose inner diameter is uniform in the lengthwise (i.e., up-and-down) direction. The supply path formation hole 21c is open at one (upper) end of the block body 21a and extends toward another (lower) end of the block body 21a. At the other end of the block body 21a, the aforementioned outlet 24 is provided. The outlet 24 is formed in a circular shape whose diameter is smaller than that of the supply path formation hole 21c and is open at the lower end of the block body 21a.

The block lid 21b is also formed by a steel material and is inserted to the supply path formation hole 21c at the one (upper) end of the block body 21a to close one end of the supply path formation hole 21c. With the one end of the supply path formation hole 21c being closed by the block lid 21b, the aforementioned supply path 23 is defined inside the block body 21a by the block body 21a and the block lid 21b.

The block body 21a is provided with a supply port 25, which communicates with an upper end of the supply path 23 and which is open to a side surface of the block body 21a.

Figure 2:
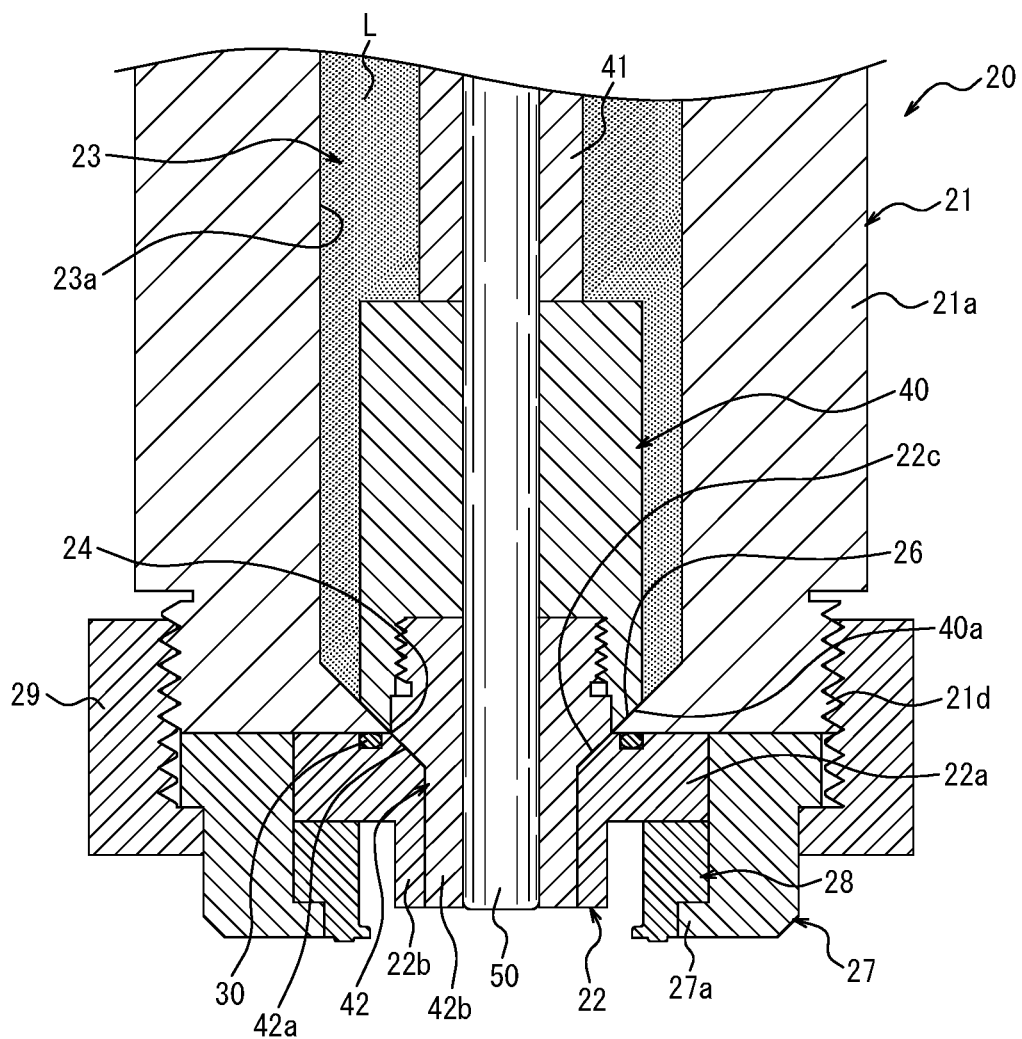
FIG. 2 is an enlarged sectional view of a portion of a liquid blow molding device of FIG. 1.

Furthermore, the block body 21a is provided, in a portion thereof that is located between an inner circumferential surface of the supply path formation hole 21c, i.e., an inner circumferential surface 23a of the supply path 23, and the outlet 24, with a sealing surface 26, which is formed integrally and contiguous with the inner circumferential surface 23a. As illustrated in FIG. 2, the sealing surface 26 has an annular shape surrounding the entire circumference of the outlet 24 and is also tapered to gradually decrease in diameter in a (downward) direction from the inner circumferential surface 23a of the supply path 23 toward the outlet 24.

Since the supply block 21 includes the block body 21a and the block lid 21b as described above, the following advantage is provided. That is, the supply block 21, which is provided at the one end thereof with the outlet 24, whose diameter is smaller than that of the supply path 23, is easily formed by a simple operation of fabricating the supply path formation hole 21c and the sealing surface 26 in the block body 21a and subsequently closing the supply path formation hole 21c with the block lid 21b.

The blow nozzle 22 is detachably attached to the lower end of the block body 21a. In more details, as illustrated in FIG. 2, the blow nozzle 22 includes an annular-shaped fixing portion 22a, which is disposed to abut against the lower end of the block body 21a, and a cylindrical-shaped nozzle body portion 22b, which protrudes from a lower end of the fixing portion 22a. The nozzle body portion 22b is configured, when the supply block 21 is displaced to a lowermost stroke end thereof, to engage to the mouth 2a of the preform 2, which is placed in the mold 10, from above.

On an outer side of the fixing portion 22a, an annular-shaped support block 27 is fitted to surround the fixing portion 22a. The support block 27 is integrally provided, in a lower end thereof, with an annular-shaped locking portion 27a, which protrudes toward an inner side in a radial direction. Between the locking portion 27a and the fixing portion 22a, a holding member 28 is disposed.

The block body 21a is integrally provided, in a portion of an outer circumferential surface that is located in the lower end thereof, with a male screw 21d. The support block 27 is fixed to the block body 21a by a fixing cap 29, which is screw-connected to the male screw 21d. By fixing the support block 27 to the block body 21a, the blow nozzle 22 is fixed to the supply block 21, with the fixing portion 22a being sandwiched between the holding member 28, which is locked by the locking portion 27a, and a lower end surface of the block body 21a. On the other hand, once the fixing cap 29 is detached from the block body 21a by releasing the screw connection of the fixing cap 29 to the male screw 21d, the blow nozzle 22, together with the support block 27 and the holding member 28, may be removed from the supply block 21. In this way, the blow nozzle 22 is detachably fixed to the supply block 21 by the fixing cap 29 via the support block 27 and the holding member 28.

Additionally, the blow nozzle 22 may be detachably attached to the supply block 21 by employing various configurations other than the above configuration using the fixing cap 29, which is screw-connected to the block body 21a. The blow nozzle 22 may be provided, on an upper surface of the fixing portion 22a thereof, with a sealing ring 30, which is configured to prevent liquid leakage between the upper surface of the fixing portion 22a and the lower end surface of the block body 21a.

Inside the supply path 23, there is disposed a sealing body 40, which is configured to open and close the outlet 24. The sealing body 40 is formed in a substantially cylindrical shape. The sealing body 40 is fixed to a lower end of a shaft body 41, which is supported by the block lid 21b in a manner such that the shaft body 41 is displaceable in the up-and-down direction, and, along with the shaft body 40, is displaceable in the up-and-down direction inside the supply path 23. Additionally, the sealing body 40 may be provided integrally with the shaft body 41. The sealing body 40 is provided, in a lower end thereof, with an annular-shaped lower end surface 40a, which extends along an outer circumference thereof. The lower end surface 40a has a tapered shape inclined at an angle corresponding to the sealing surface 26, which is provided in the block body 21a. When the sealing body 40 reaches a closing position, namely, a lowermost stroke end position thereof, the lower end surface 40a comes into abutment against the sealing surface 26. By the lower end surface 40a thus abutting against the sealing surface 26, the outlet 24 of the supply path 23 is closed by the sealing body 40. On the other hand, when the sealing body 40 is displaced upward from the closing position and reaches an opening position, the lower end surface 40a of the sealing body 40 becomes spaced from the sealing surface 26, and the outlet 24 of the supply path 23 is opened.

As illustrated in FIG. 2, the fixing portion 22a of the blow nozzle 22 is provided with a sub-sealing surface 22c, which is situated flush with and adjacent to the sealing surface 26.

On the other hand, a sub-sealing body 42 is detachably attached to the lower end of the sealing body 40 by screw connection. The sub-sealing body 42 has a lower end surface 42a, which has a tapered shape and is situated flush with the lower end surface 40a. When the sealing body 40 reaches the closing position, the lower end surface 42a comes into abutment against the sub-sealing surface 22c of the blow nozzle 22. Thus, when the sealing body 40 reaches the closing position, the lower end surface 40a of the sealing body 40 is brought into abutment against the sealing surface 26 of the block body 21a, and the lower end surface 42a of the sub-sealing body 42 is brought into abutment against the sub-sealing surface 22c of the blow nozzle 22, and the flow path between the supply path 23 and the blow nozzle 22 is closed even more reliably. Additionally, the sub-sealing body 42 does not necessarily need to be screw-connected and may be attached to the sealing body 40 by any other configuration. Furthermore, a sealing O-ring may be disposed below a portion of the sub-sealing body 42 in which the sub-sealing body 42 is screw-connected to the sealing body 40 (i.e., in a depressed portion of the sub-sealing body 42).

The sub-sealing body 42 is integrally provided with a protrusion 42b, which protrudes downward on the inner side of the lower end surface 42a. The protrusion 42b is formed in a cylindrical shape and configured, when the sealing body 40 is in the closing position, to be disposed inside the nozzle body 22b of the blow nozzle 22 to fill the entire inner region of the nozzle body 22b. When the sealing body 40 is in the closing position, in which the outlet 24 or the blow nozzle 22 is closed, the above configuration prevents the liquid L from remaining inside the nozzle body 22b of the blow nozzle 22, thereby preventing liquid-dripping from the blow nozzle 22.

The liquid blow molding device 1 may also include a stretching rod 50. The stretching rod 50 extends through an axial center of the shaft body 41, the sealing body 40, and the sub-sealing body 42 and may emerge downward from a lower end of the protrusion 42b of the sub-sealing body 42. The stretching rod 50 may be driven by a driving source (which is not illustrated) to be displaced downward, thereby stretching the preform 2 in an axial direction. The liquid blow molding device 1, when including the stretching rod 50 as described above, is capable of biaxial stretch blow molding in which the preform 2 is stretched in the axial direction by the stretching rod 50 while the preform 2 is stretched in the radial direction by the pressurized liquid L. Additionally, the liquid blow molding device 1 does not necessarily need to include the stretching rod 50.

As illustrated in FIG. 1, a pressurized liquid supply unit 60 is connected to the supply port 25 of the block body 21a through a pipe P1. The pressurized liquid supply unit 60 may be configured by a plunger pump including, for example, a cylinder 60a and a piston 60b.

To the pressurized liquid supply unit 60, a supply tank 61 is connected through a pipe P2. The supply tank 61 may be configured to contain the liquid L and to heat the liquid L to a predetermined temperature and maintain the liquid L at the temperature. The pipe P2, which is provided between the pressurized liquid supply unit 60 and the supply tank 61, is provided with an opening-closing valve V, which is configured to open and close the pipe P2. Additionally, reference numeral 62 refers to a pressure gauge provided in the pipe P1.

The pressurized liquid supply unit 60 is configured to supply the liquid L, which has been pressurized to a predetermined pressure, to the blow nozzle 22 via the pipe P1, the supply port 25, and the supply path 23, by actuating the piston 60b in a positive (i.e., pressurizing) direction, in a state where the sealing body 40 is in the opening position, in which the outlet 24 of the supply path 23 and the blow nozzle 22 are opened, and where the opening-closing valve V is closed. The pressurized liquid supply unit 60 is also configured to draw the liquid L, which is contained in the supply tank 61, into the cylinder 60a of the pressurized liquid supply unit 60, by actuating the piston 60b in the opposite (i.e., drawing) direction, in a state where the sealing body 40 is in the closing position, in which the outlet 24 of the supply path 23 and the blow nozzle 22 are closed, and where the opening-closing valve V is opened.

Operations of the nozzle unit 20, the sealing body 40, the stretching rod 50, the pressurized liquid supply unit 60, and the opening-closing valve V are subject to integrated control by a control apparatus which is not illustrated. The control may be conducted with reference to a value of the pressure gauge 62. Additionally, the opening-closing valve V is preferably a solenoid valve that may be controlled by the control apparatus.

Next, a description is given of a method of molding the closed-bottom tubular-shaped preform 2 into a liquid container C, in which the content liquid is contained in a container having a predetermined shape, by using the liquid blow molding device 1 configured as above.

Firstly, the preform 2, which has been heated in advance to a predetermined temperature (e.g., from 80° C. to 150° C.) around which stretchability is achieved by using a heating unit (which is not illustrated) such as a heater, is placed in the mold 10 used for blow molding, and the mold 10 is closed.

After placing the preform 2 in the mold 10, the nozzle unit 20 is subsequently displaced downward toward the mold 10, and the nozzle body 22b of the blow nozzle 22 is engaged to the mouth 2a of the preform 2.

Figure 3:
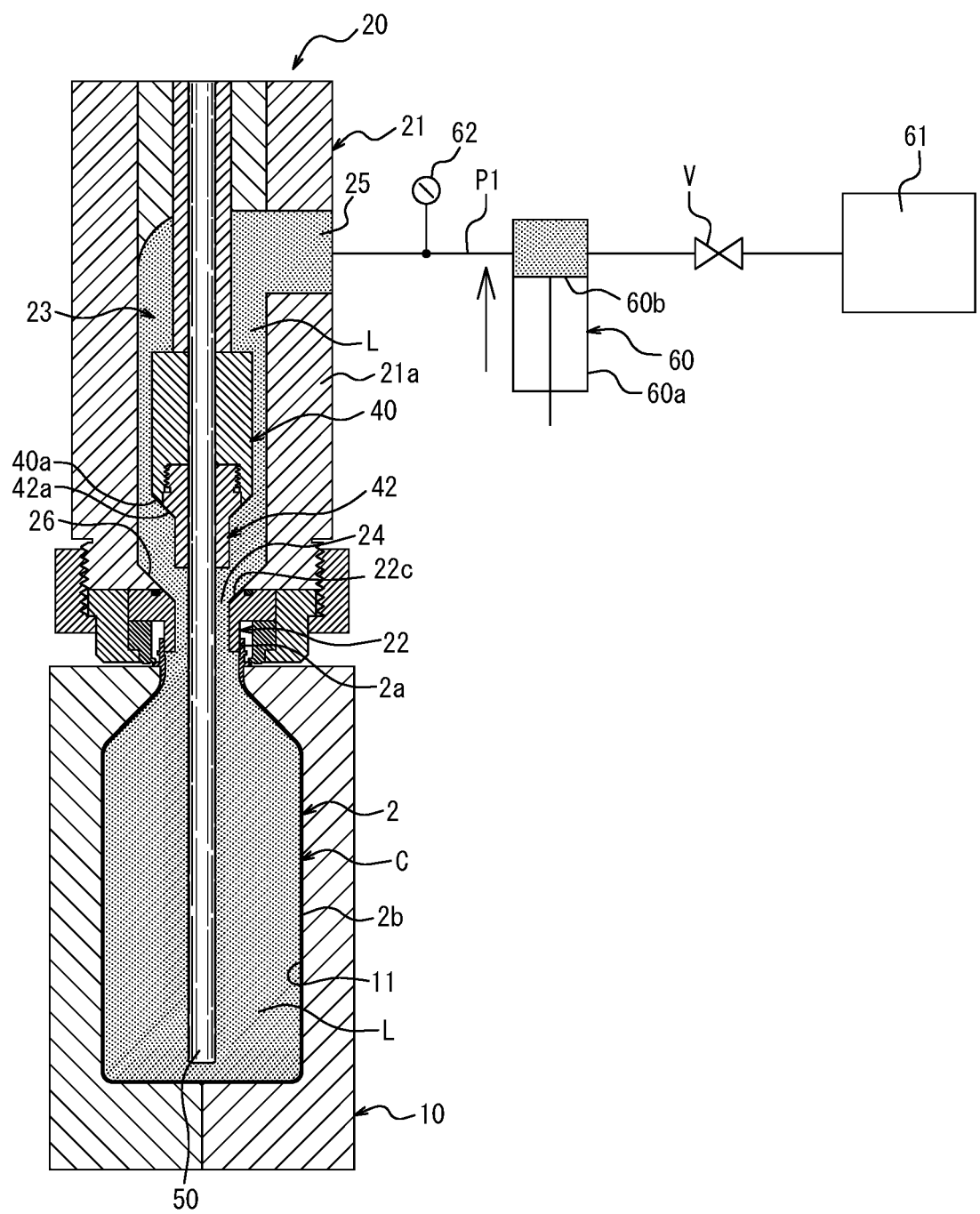
FIG. 3 illustrates a liquid blow molding device in a state during liquid blow molding.

Subsequently, as illustrated in FIG. 3, the sealing body 40 is displaced to the opening position to open the outlet 24 of the supply path 23 and the blow nozzle 22, while the opening-closing valve V remains closed. Under this state, the piston 60b of the pressurized liquid supply unit 60 is actuated in the positive (i.e., pressurizing) direction. As a result, the liquid L, which has been pressurized to a predetermined pressure, is supplied from the pressurized liquid supply unit 60 into the preform 2 through the supply path 23 and the blow nozzle 22, and the preform 2 is blow molded by the pressure of the liquid L. In the blow molding, the preform 2 continues to be molded until the preform 2 is turned into the liquid container C, which has a predetermined shape conforming to the cavity 11. Once the preform 2 is molded into the liquid container C illustrated in FIG. 3, the blow molding is completed.

When the liquid blow molding device 1 includes the stretching rod 50, the stretching rod 50 may be displaced and advanced downward, in advance of or concurrently with the blow molding, so that the preform 2 may be stretched in the axial (i.e., lengthwise) direction by the stretching rod 50. In this way, the liquid blow molding device 1 is capable of biaxial stretch blow molding in which the preform 2 is molded in biaxial directions both by the pressure of the liquid L and the stretching rod 50. The biaxial stretch blow molding allows the preform 2 to be molded into the liquid container C, which has a predetermined shape, with even higher accuracy.

Additionally, the completion of the blow molding may be followed, as needed, by a suck-back step of sucking a predetermined amount of the liquid L from the inside of the molded liquid container C back to the supply path 23 to create a head space inside the completed liquid container C. When the liquid blow molding device 1 includes the stretching rod 50, the amount of the liquid L to be sucked from the inside of the liquid container C back to the supply path 23 in the suck-back step may be determined by taking into consideration a reduction in volume caused by withdrawal of the stretching rod 50 from the liquid container C.

Figure 4:
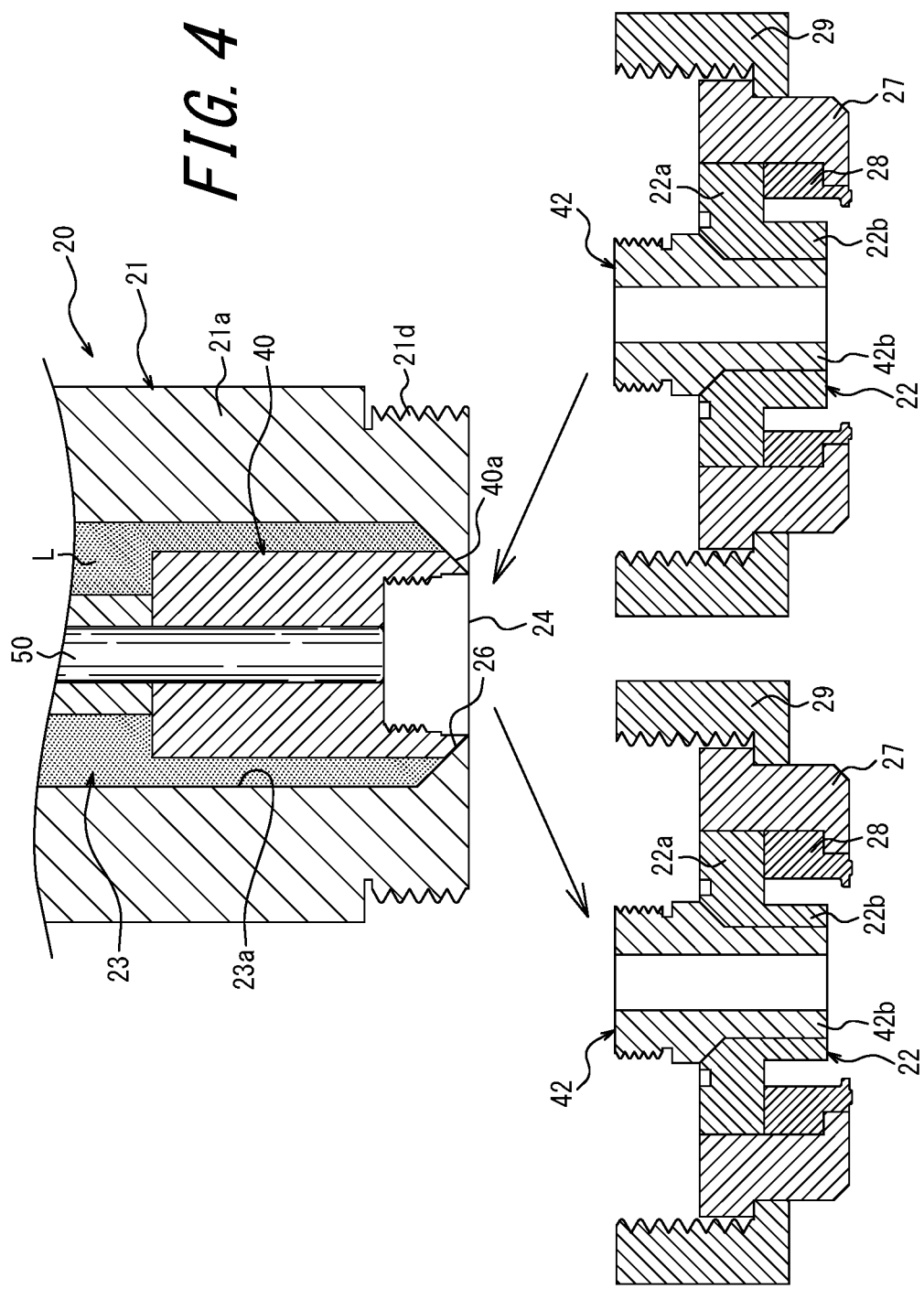
FIG. 4 illustrates a state in which a blow nozzle is detached from a supply block.

Since, in the liquid blow molding device 1 according to the present embodiment, the blow nozzle 22 is detachably attached to the supply block 21, the blow nozzle 22 may be detached from the supply block 21. Accordingly, as illustrated in FIG. 4, for example, the blow nozzle 22, together with the fixing cap 29, the support block 27, and the holding member 28, may be removed from the supply block 21, and a different blow nozzle 22, which has a different shape or size, together with the fixing cap 29, the support block 27, and the holding member 28, may be attached to the supply block 21. In this way, the liquid blow molding device 1 is capable of adapting to the preform 2 of various types, each of which has a different shape of the mouth 2a and a different outer diameter. Furthermore, in the event of failure of the blow nozzle 22, the blow nozzle 22 may be detached from the supply block 21 for inspection or the like.

Herein, in the liquid blow molding device 1 according to the present embodiment, the annular-shaped sealing surface 26, which surrounds the entire circumference of the outlet 24, is provided in the portion of the supply block 21 that is located between the inner circumferential surface 23a of the supply path 23 and the outlet 24 of the supply path 23. By the sealing surface 26 brought into abutment against the lower end surface 40a of the sealing body 40 all around, the outlet 24 of the supply path 23 is closed. Accordingly, as illustrated in FIG. 4, even when the blow nozzle 22 is detached from the supply block 21, the outlet 24 of the supply path 23 remains closed by the sealing body 40, and the liquid L inside the supply path 23 is prevented from leaking to the outside from the outlet 24.

In the example of FIG. 4, the blow nozzle 22, after detached from the supply block 21, is replaced with the different blow nozzle 22, which has an inner diameter different from that of the detached blow nozzle 22. Accordingly, the sub-sealing body 42 with the protrusion 42b to be inserted to the blow nozzle 22 is also detached from the sealing body 40 and replaced with a different sub-sealing body 42, which includes the protrusion 42b with a diameter corresponding to the newly attached blow nozzle 22. In this case, the blow nozzle 22, together with the fixing cap 29, the support block 27, and the holding member 28, may be detached from the supply block 21 before detaching the sub-sealing body 42 from the sealing body 40. Alternatively, the blow nozzle 22, together with the fixing cap 29, the support block 27, and the holding member 28, may be detached from the supply block 21 concurrently with detaching the sub-sealing body 42 from the sealing body 40. Additionally, when the blow nozzle 22, after detached from the supply block 21, is attached to the supply block 21 again or when the different blow nozzle 22 with the same shape as the blow nozzle 22 detached from the supply block 21 is attached to the supply block 21, for example, the blow nozzle 22 may be attached and detached without detaching the sub-sealing body 42 from the sealing body 40.

Thus, the liquid blow molding device 1 according to the present embodiment allows, when the blow nozzle 22 is replaced with the different blow nozzle 22 with a different shape or size, the blow nozzle 22 to be detached from the supply block 21 without letting the liquid L leak from the supply path 23. This omits the needs to remove the liquid L from a flow path, including the supply path 23 between the pressurized liquid supply unit 60 and the blow nozzle 22 and the pipe P1, in advance prior to the replacement of the blow nozzle 22, and to supply the liquid L to the flow path again and conduct the operation of bleeding air out of the flow path after the attachment of the different blow nozzle 22, thereby facilitating the operation of replacing the blow nozzle 22.

Furthermore, in the liquid blow molding device 1 according to the present embodiment, the sealing surface 26, which is provided in the supply block 21, has the tapered shape gradually decreasing in diameter in the direction from the inner circumferential surface 23a of the supply path 23 toward the outlet 24. This ensures that the outlet 24 is closed by the sealing body 40, thereby preventing liquid leakage even more reliably in the state in which the blow nozzle 22 is detached.

Figure 5:
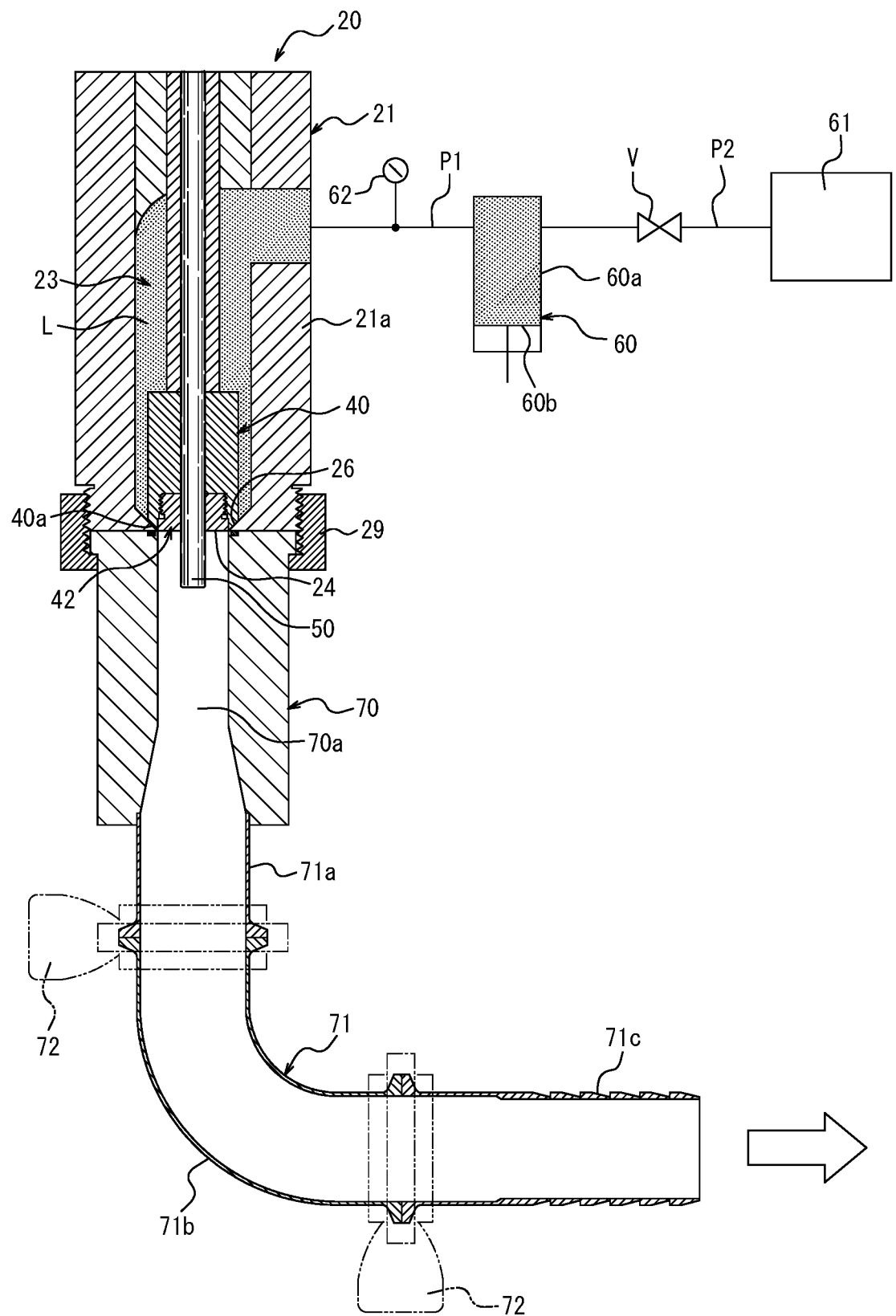
FIG. 5 illustrates a state in which a discharge hose, instead of a blow nozzle, is attached to a supply block.
Figure 6:
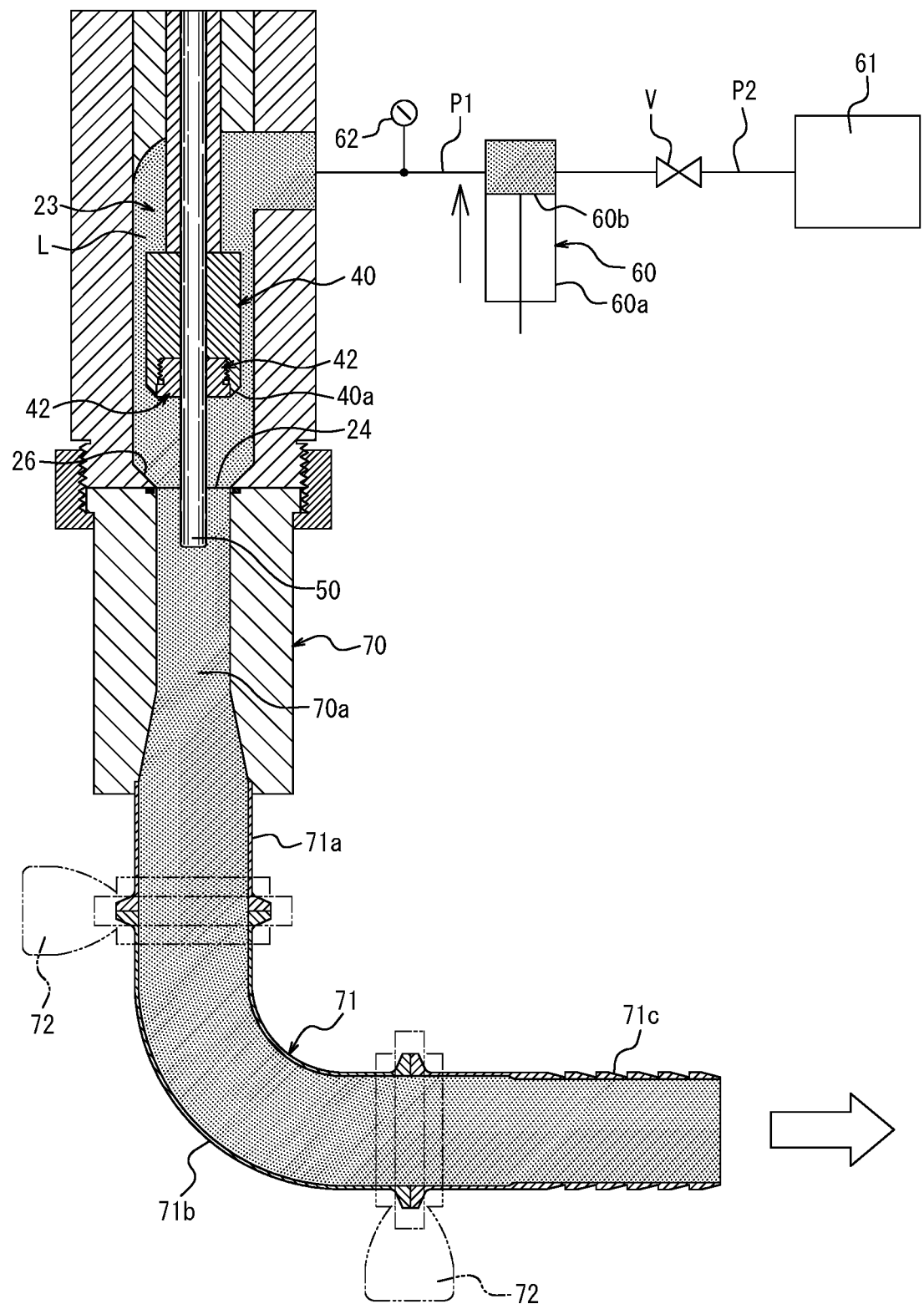
FIG. 6 illustrates how a liquid inside a supply path is discharged to the outside through a discharge hose.

As illustrated in FIGS. 5 and 6, in the liquid blow molding device 1 according to the present embodiment, after the blow nozzle 22 is detached from the supply block 21, a discharge hose 71, instead of the blow nozzle 22, may be attached to the supply block 21 via an adapter 70. Attaching the discharge hose 71 to the supply block 21 enables the liquid L inside the supply path 23 to be discharged to a discharge tank (which is not illustrated) or the like through the discharge hose 71. Accordingly, at the time of cleaning the inside of the flow path, including the supply path 23 between the pressurized liquid supply unit 60 and the blow nozzle 22 and the pipe P1, the liquid L is easily discharged from the flow path.

The adaptor 70 may be fixed to the supply block 21 by using the fixing cap 29, which is identical to the one used to fix the blow nozzle 22 to the supply block 21. Although the sub-sealing body 42 in FIGS. 5 and 6 does not include the protrusion 42b, the sub-sealing body 42 with the protrusion 42b may also be used.

As illustrated in the figures, the discharge hose 71, as used herein, may include a straight first hose 71a, which has a tip fixed to the adaptor 70 to communicate with a discharge passage 70a inside the adaptor 70, a curved second hose 71b, which is connected to the first hose 72 by using a junction 72, and a straight third hose 71c, which is connected to the second hose 71b by using the junction 72. However, pumps with various configurations, such as a bellows-shaped hose, may be used.

In a state in which the discharge hose 71 is connected to the supply block 21, the sealing body 40 is displaced to the opening position, and the piston 60b of the pressurized liquid supply unit 60 is actuated in the positive direction. By doing so, the liquid L inside the flow path, including the supply path 23 between the pressurized liquid supply unit 60 and the blow nozzle 22 and the pipe P1, is discharged to the outside through the discharge hose 71. At this time, by repeatedly actuating the piston 60b of the pressurized liquid supply unit 60 in the positive direction by introducing air into the cylinder 60a without supplementing the liquid L from the supply tank 61, air is introduced from the cylinder 60a into the flow path, and the introduced air forces the whole liquid L inside the flow path to be discharged to the outside through the discharge hose 71.

Needless to say, the present disclosure is not limited to the above embodiment, and various changes may be made without departing the gist of the present disclosure.

For example, although in the above embodiment the sealing surface 26, which is provided in the block body 21a, has the tapered shape, the present disclosure is not limited to this embodiment. The sealing surface 26 may have a flat shape perpendicular to the direction of displacement of the sealing body 40.

Furthermore, although in the present embodiment the sealing surface 26 is integrally provided in the block body 21a, which includes the supply path 23, the present disclosure is not limited to this embodiment. An additional member including the sealing surface 26 may be fixed to the block body 21a, which includes the supply path 23.

Moreover, although in the above embodiment the sub-sealing body 42 is attached to the sealing body 40, and the sub-sealing surface 22c, against which the lower end surface 42a of the sub-sealing body 42 abuts, is provided in the blow nozzle 22, the sub-sealing body 42 and the sub-sealing surface 22c may be omitted.

Moreover, although in the above embodiment the sub-sealing body 42, which is formed as a separate body from the sealing body 40, is attached to the sealing body 40, the sub-sealing body 42 may be formed integrally with the sealing body 40.

Moreover, although in the above embodiment the supply block 21 includes the block body 21a and the block lid 21b, the present disclosure is not limited to this embodiment. The supply block 21, which includes inside thereof the supply path 23, may have any other configuration or structure.

Moreover, FIGS. 5 and 6 in the above embodiment illustrate a case in which, instead of the blow nozzle 22, the discharge hose 71 is attached to the supply block 21. However, instead of the blow nozzle 22, a different member, such as a Cleaning In Place (CIP) nozzle, may be attached to the supply block 21. In this case also, even when the blow nozzle 22 is detached from the supply block 21, the liquid L is prevented from leaking from the outlet 24 until the sealing body 40 is displaced to the opening position, and an operation of attaching the member is easily conducted.

Moreover, although in the above embodiment the pressurized liquid supply unit 60 is a plunger pump, the present disclosure is not limited to this embodiment, and pumps with various configurations capable of pressurizing the liquid L to a predetermined pressure and supplying the pressurized liquid L to the preform 2 may be used.

REFERENCE SIGNS LIST

1 Liquid blow molding device
2 Preform
2a Mouth
2b Trunk
10 Mold
11 Cavity
20 Nozzle unit
21 Supply block
21a Block body
21b Block lid
21c Supply path formation hole
21d Male screw
22 Blow nozzle
22a Fixing portion
22b Nozzle body
22c Sub-sealing surface
23 Supply path
23a Inner circumferential surface
24 Outlet
25 Supply port
26 Sealing surface
27 Support block
27a Locking portion
28 Holding member
29 Fixing cap
30 Sealing ring
40 Sealing body
40a Lower end surface
41 Shaft body
42 Sub-sealing body
42a Lower end surface
42b Protrusion
50 Stretching rod
60 Pressurized liquid supply unit
60a Cylinder
60b Piston
61 Supply tank
62 Pressure gauge
70 Adaptor
70a Discharge passage
71 Discharge hose
71a First hose
71b Second hose
71c Third hose
72 Junction
L Liquid
P1 Pipe
P2 Pipe
V Opening-closing valve
C Liquid container

The invention claimed is:

1. A liquid blow molding device that blow molds a synthetic resin-made preform into a container having a predetermined shape, by supplying a pressurized liquid into the preform, the liquid blow molding device comprising:
a supply block including a supply path for the liquid;
a blow nozzle that is detachably attached to the supply block such that the blow nozzle communicates with an outlet of the supply path and the blow nozzle is configured to engage to a mouth of the preform;
a pressurized liquid supply unit that is connected to the supply path and that is configured to supply the pressurized liquid to the blow nozzle through the supply path;
an annular-shaped sealing surface included in a portion of the supply block that is located between an inner circumferential surface defining the supply path and the outlet, and the sealing surface surrounds an entire circumference of the outlet; and
a sealing body that is disposed inside the supply path and that is displaceable between a closing position and an opening position, wherein:
in the closing position, the sealing body abuts against the sealing surface to close the outlet, and in the opening position, the sealing body is spaced away from the sealing surface to open the outlet, and
the supply block includes:
a unibody block body including i) a supply path formation hole having a uniform inner diameter and being open at a first end of the block body, ii) the outlet having an inner diameter smaller than the inner diameter of the supply path formation hole and being open at a second end of the block body, and iii) the sealing surface provided between an inner circumferential surface of the supply path formation hole and the outlet, and formed integrally and contiguous with the inner circumferential surface of the supply path formation hole;
a block lid that is inserted into the supply path formation hole at the first end of the block body to close the first end of the supply path formation hole and that, together with the block body, defines the supply path inside the block body; and
a supply port that is provided in the block body, the supply port communicates with the supply path, and the supply port is open to a side surface of the block body to be connected to the pressurized liquid supply unit.

2. The blow molding device according to claim 1, wherein the sealing surface has a tapered shape gradually decreasing in diameter in a direction from the inner circumferential surface toward the outlet.

3. The blow molding device according to claim 1, wherein the blow nozzle is provided with a sub-sealing surface situated flush with and adjacent to the sealing surface, and a sub-sealing body is detachably attached to the sealing body, the sub-sealing body being configured to abut against the sub-sealing surface when the sealing body is in the closing position.

4. The blow molding device according to claim 3, wherein the sub-sealing body includes a protrusion configured to be disposed inside the blow nozzle when the sealing body is in the closing position.

5. The blow molding device according to claim 1, further comprising:

a stretching rod that is configured to stretch the preform in an axial direction and that is provided to extend through an axial center of the sealing body in an advanceable and retractable manner.

* * * * *